June 27, 1933.  W. C. HEDGCOCK  1,916,144
TRUCK
Filed Oct. 2, 1931  5 Sheets-Sheet 1

Inventor:
William C. Hedgcock,
By Wilkinson, Huxley, Byron & Knight
attys

June 27, 1933.     W. C. HEDGCOCK     1,916,144
TRUCK
Filed Oct. 2, 1931     5 Sheets-Sheet 2
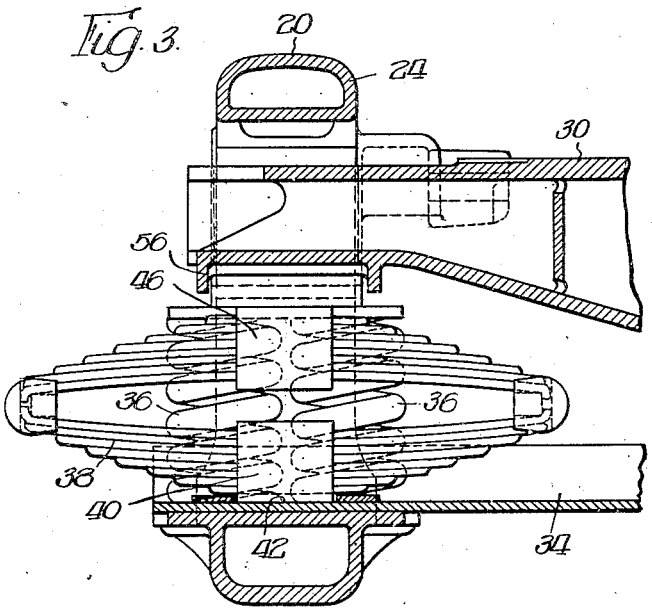
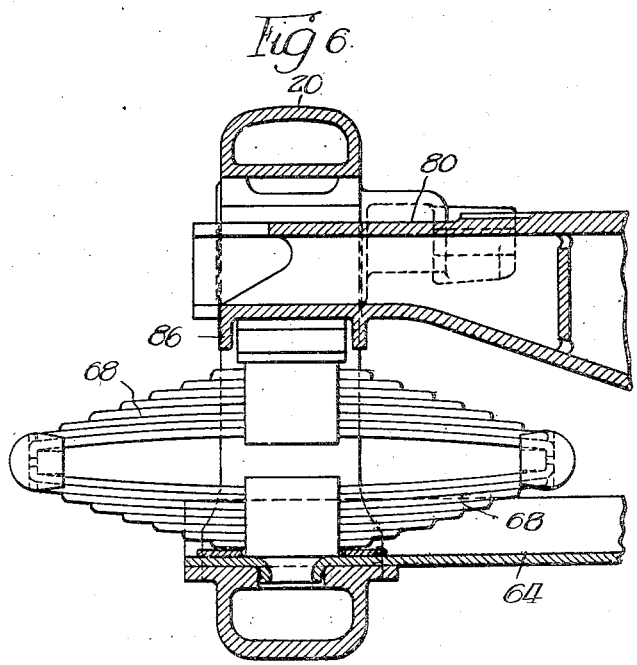
Inventor:
William C. Hedgcock.
By Wilkinson, Huxley, Byron & Knight
Attys.

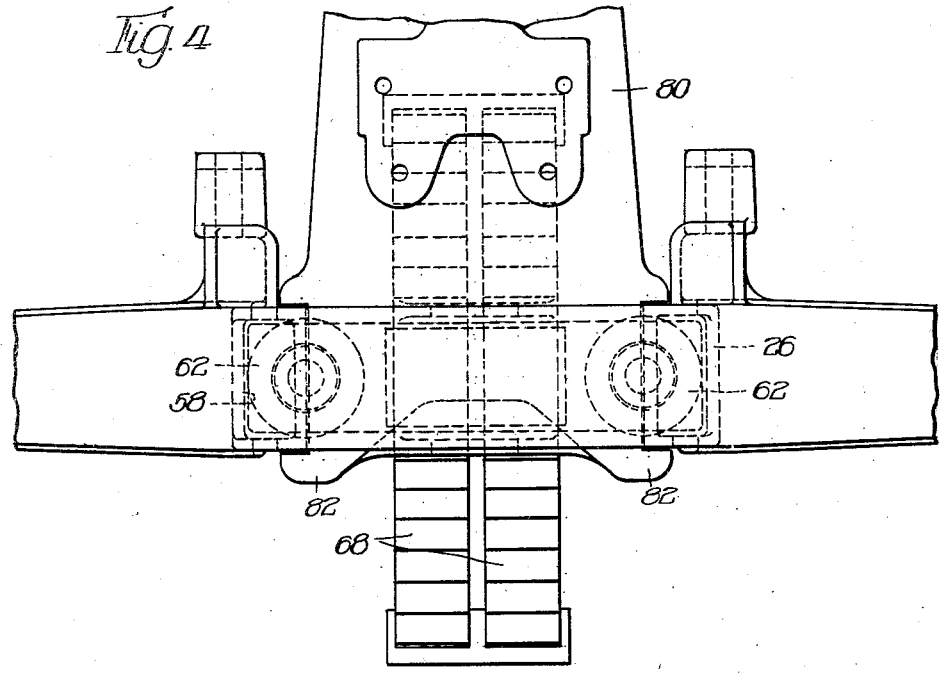
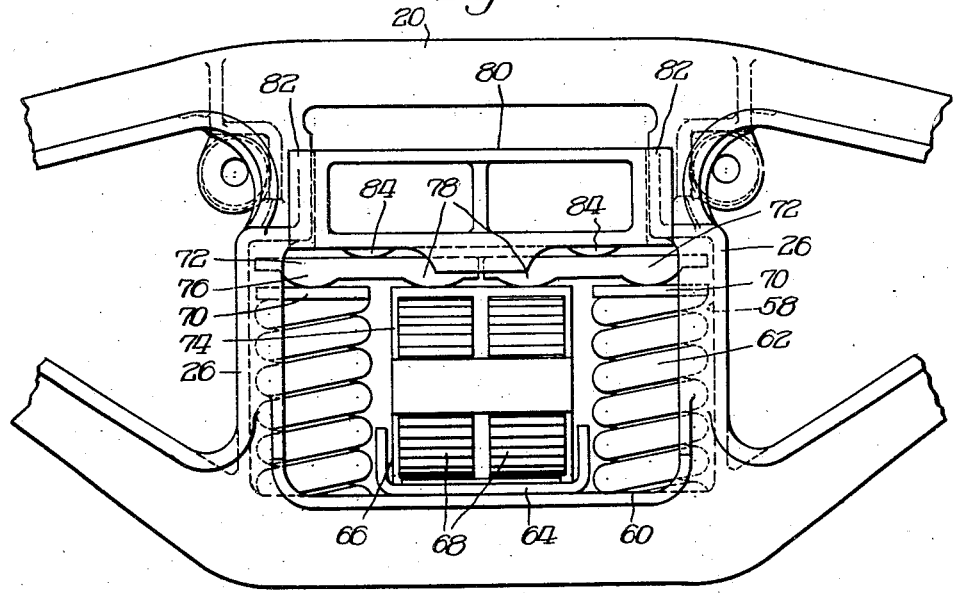

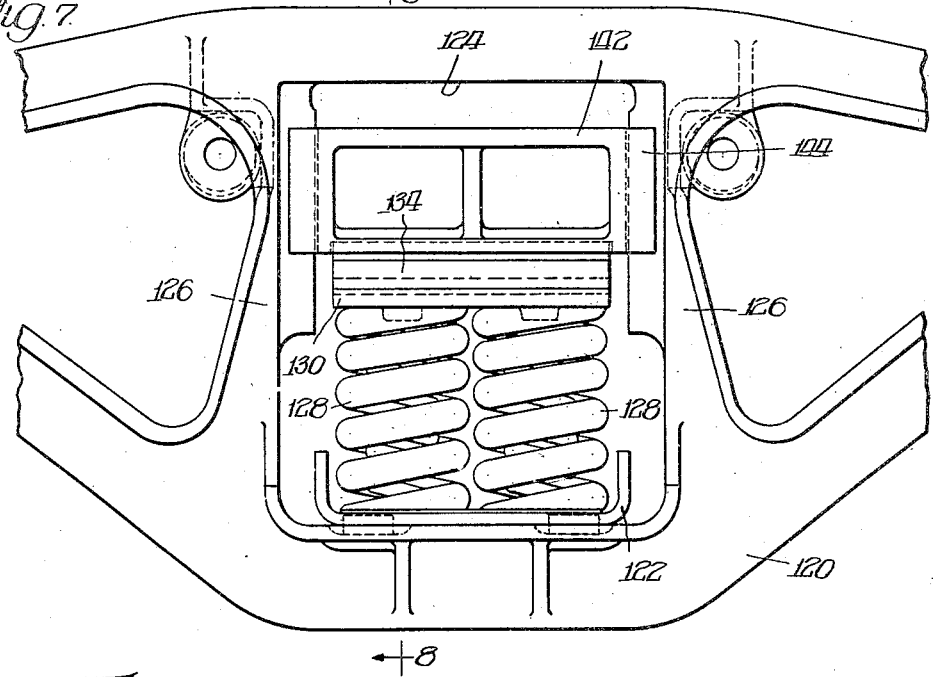
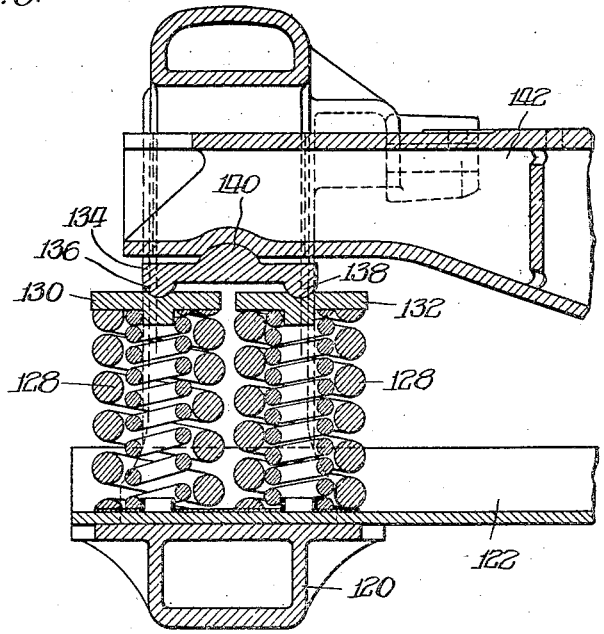

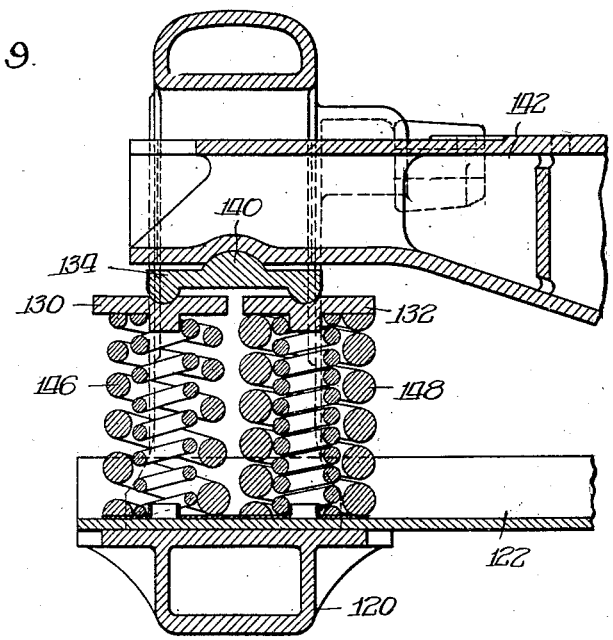
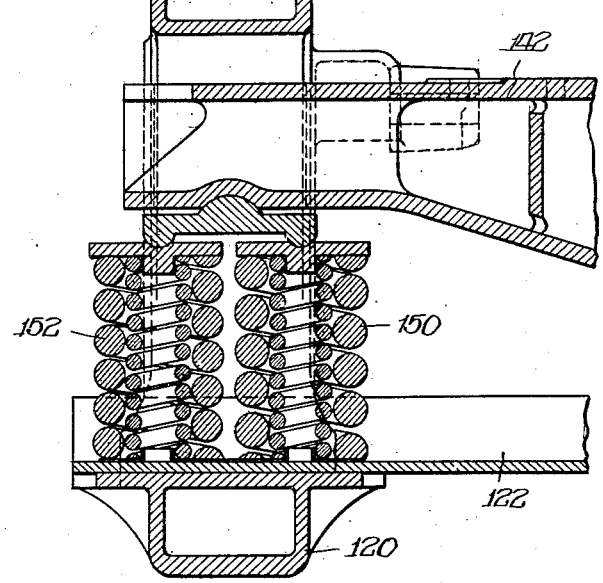

Patented June 27, 1933

1,916,144

UNITED STATES PATENT OFFICE

WILLIAM C. HEDGCOCK, OF WILMETTE, ILLINOIS, ASSIGNOR TO AMERICAN STEEL FOUNDRIES, OF CHICAGO, ILLINOIS, A CORPORATION OF NEW JERSEY

TRUCK

Application filed October 2, 1931. Serial No. 566,437.

This invention pertains to car trucks.

The usual present freight car truck has a spring suspension of coil springs. These coil springs are arranged so that they have relatively free motion and they are very deficient in good riding qualities, inasmuch as they have a natural period of oscillation which is reached at some operating speed of the car. This natural period of oscillation, when reached, results in synchronous motion which is transmitted violently to the truck bolster, the car body and lading, often resulting in the damage or even the destruction of the lading.

It is an object of this invention to provide a car truck having an improved spring suspension affording easy riding qualities.

Another object of the invention is to provide a coil and/or other spring suspension for a car truck wherein a construction is provided to eliminate or dampen synchronous motion.

A further object of the invention is to provide a car truck wherein a spring suspension is arranged so that there will be softer spring action under light loads, yet at the same time stiff spring action and ample capacity will be provided under heavy loads.

With these and various other objects in view, the invention may consist of certain novel features of construction and operation as will be more fully described and particularly pointed out in the specification, drawings and claims appended hereto.

In the drawings, which illustrate embodiments of the device and wherein like reference characters are used to designate like parts—

Figure 3 is a fragmentary sectional elevation taken substantially on the transverse center line of the truck construction shown in Figures 1 and 2;

Figure 4 is a fragmentary top plan view of a modified form of truck construction;

Figure 5 is a side elevation of the construction shown in Figure 4;

Figure 6 is a fragmentary sectional elevation taken substantially on the transverse center line of the truck construction shown in Figures 4 and 5;

Figure 7 is a fragmentary side elevation of still another modified form of truck construction;

Figures 8, 9 and 10 are fragmentary transverse sectional elevations taken substantially in the plane as indicated by the line 8—8 of Figure 7, said figures showing modified forms of spring suspensions.

Figure 1:
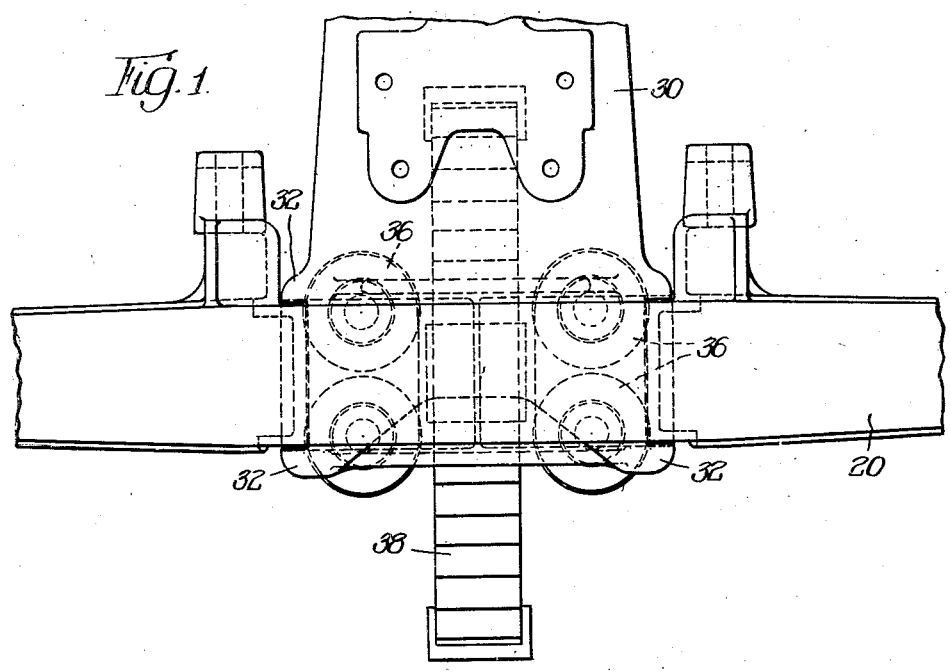
Figure 1 is a fragmentary top plan view of a truck construction embodying the invention.
Figure 2:
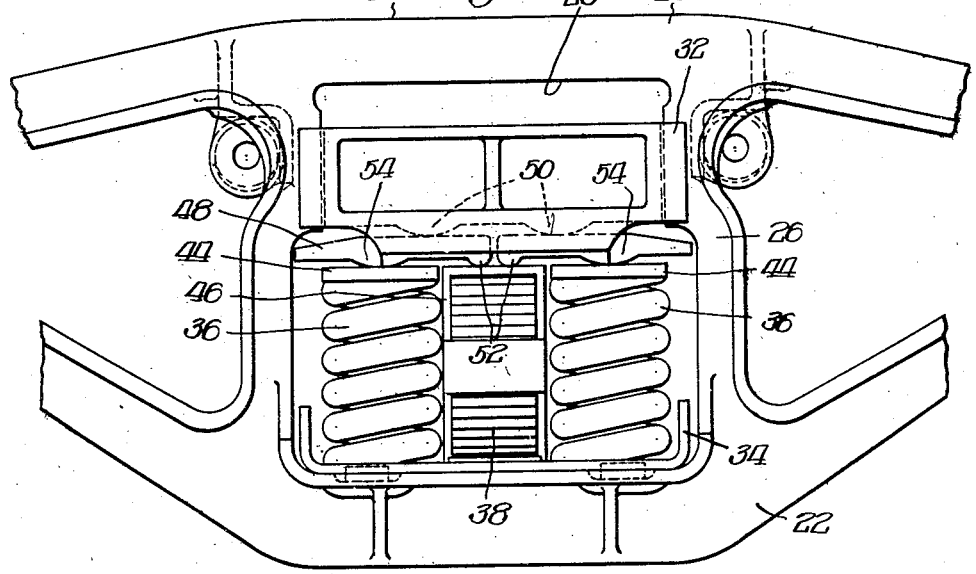
Figure 2 is a side elevation of the construction shown in Figure 1.

Referring first of all more particularly to the construction illustrated in Figures 1, 2 and 3, the truck side frame 20 is preferably of truss construction including the tension member 22 and the compression member 24 integrally connected by spaced column guides 26 and forming the window 28 in the side frame. The tension and compression members merge adjacent their ends and are provided with any preferred form of journal boxes cooperating with the journal ends of any preferred form of wheel and axle assemblies.

The bolster 30 is disposed between the spaced side frames and extends into the bolster opening, being provided with lugs 32 embracing the column guides for sliding co-operation therewith, the columns being cut out adjacent the lower arch bar for permitting ready application of the bolster to the side frames. The side frames are connected by means of the spring plank 34 disposed on the lower arch bar between the columns 26. The spring plank is provided with spaced coil spring nests 36, a plurality of said nests (shown two) being disposed on each side of a single elliptic spring assembly 38. The lower spring band 40 thereof is seated in the seat 42 provided on the spring plank.

Pairs of coil spring assemblies 36 on each side of the leaf spring assembly 38 are provided with the spring caps 44, and between each spring cap 44 and the upper spring band 46 equalizer members 48 are disposed on which the bolster 30 is mounted. The bolster 30 is provided with a pair of arcuate fulcrum points 50 seating on the pair of equalizer members 48, said members being provided with the adjacent arcuate fulcrum points 52 seated on the inner spring band 46 and the outer fulcrum points 54 seated on the respective spring caps 44. The distance between the fulcrum points 52, 50 and 54 is proportioned so as to properly distribute the load on the several springs in proportion to the capacity of the different springs. The equalizers are so shaped as to be guided by each other and by the columns 26 against endwise displacement, and by the depending flanges 56 on the bolster against lateral displacement. The equalizers are free to tilt upon their seats 52 and 54, depending upon the differential deflection of coil and leaf springs and thereby permit of said differential deflection, and also permit independent movement of two kinds of springs.

In the modification illustrated in Figures 4, 5 and 6, the columns 26 are recessed as at 58, and spring seats 60 are provided on the lower arch bar of the side frame between the columns for the reception of the coil spring assemblies 62. The spring plank 64 connecting the side frames is disposed between the spaced coil spring assemblies 62 and the lower spring band 66 and the plurality of elliptic leaf spring assemblies 68 is mounted in said spring plank. Each coil spring assembly 62 is provided with the spring cap 70, and an equalizing member 72 is mounted between each spring cap 70 and the upper spring band 74 of the leaf spring assemblies 68. The equalizers are provided with the arcuate fulcrum points 76 and 78 cooperating with the spring cap and spring bands.

The bolster 80 is provided with the embracing lugs 82 and slidably cooperates with the column guide 86, the bolster being provided with the spaced arcuate fulcrum points 84 by which the bolster is supported on the equalizer 72. In this construction the operation is the same as above described and the fulcrum points 78, 84 and 76 are spaced to properly distribute the load on several springs, the equalizers being guided by each other and by the column guides against endwise movement, and by the depending flanges, the pockets in the column guides, and the depending bolster flanges 86 against lateral movement.

In the construction shown in Figures 7 to 10 inclusive, the side frames 120 are connected by means of the spring plank 122, the spring plank being mounted in the bolster opening 124 defined by the column guides 126. The nests of coil springs 128 are mounted on the spring plank substantially in the plane of the side frame and consequently in the bolster opening. The outer nests of the coil springs are provided with the spring cap 130, and the inner nests of coil springs are provided with the spring cap 132. The equalizer member 134 is fulcrumed on the spring caps 130 and 132 through the arcuate fulcrum points 136 and 138, and is provided with the fulcrum point 140 on which the bolster 142 is supported, the bolster extending into the bolster opening and being provided with the lugs 144 embracing the column guides 126, the bolster being mounted for vertical movement in said column guides.

In the modification shown in Figure 8, the coil spring assemblies 128 are shown including springs of variable pitch. In the modification shown in Figure 9 the outer nests 146 are formed of springs of variable sectional area. That is, the springs are formed from a bar of tapering diameter, while the inner nests of springs are formed of springs of constant sectional area and constant pitch. In the modification shown in Figure 10 the inner and outer nests 150 and 152 are formed of springs of constant pitch and constant sectional diameter, but the springs are of different characteristics.

Of course it is to be understood that in all the modifications, any springs of different characteristics may be employed, such as the springs of variable stiffness illustrated in application Serial No. 552,153 filed July 21, 1931, it being preferable that the deflection of the different nests, or of the different nest spacings be dissimilar. Having different stiffnesses or different characteristics, the period of oscillation of the nests will not be the same. Further, as the arcuate surfaces of the fulcrum points between the equalizer member and the spring caps move relatively to each other, friction results between the parts, tending to check oscillation of the bolster.

In operation, when vertical motion is imparted to the side frame due to striking track irregularities, such motion is imparted to the bolster and the car body through the springs. The force required to accelerate the bolster and car body upward, or to decelerate them downward must be imparted through the springs. Such a force causes a different deflection of the coil spring nests as the springs have different characteristics, and therefore have different periods of oscillation, thus preventing synchronous motion from being set up, since a reaction comes from one to the other of the spring nests through the equalizer so that each tends to dampen or nullify the synchronous motion of the other. Furthermore, the motion of the two springs being different requires an oscillatory motion of the equalizer, thus causing friction between the equalizer and the bolster, and between the equalizer and the spring cap, which dampens or nullifies spring oscillation.

It is to be understood that I do not wish to be limited by the exact embodiments of the device shown which are merely by way of illustration and not limitation, as various and other forms of the device will of course be apparent to those skilled in the art without departing from the spirit of the invention or the scope of the claims.

What is claimed is—

1. In a car truck, the combination of a side frame and a bolster, coil springs and elliptic springs carried by said side frame for supporting said bolster, and equalizing means interposed between said bolster and said coil and elliptic springs, said bolster engaging said equalizing means between the points of engagement between said equalizing means and said springs.

2. In a car truck, the combination of a side frame and a bolster, coil springs and elliptic springs carried by said side frame for supporting said bolster, and load distributing means interposed between said bolster and said coil and elliptic springs whereby said coil springs and said elliptic springs are permitted independent motion.

3. In a car truck, the combination of a side frame and a bolster, coil springs and elliptic springs carried by said side frame for supporting said bolster, and load distributing means interposed between said bolster and said coil and elliptic springs whereby said coil springs and said elliptic springs are permitted independent motion, and means for positioning said load distributing means.

4. In a car truck, the combination of a side frame including tension and compression members and spaced connecting column guides forming a bolster opening, a bolster extending into said opening and slidably cooperating with said column guides, springs of different character for supporting said bolster, and equalizer means interposed between said springs and said bolster.

5. In a car truck, the combination of a side frame including tension and compression members and spaced connecting column guides forming a bolster opening, a bolster extending into said opening and slidably cooperating with said column guides, resilient means and friction means for supporting said bolster, and equalizer means interposed between said bolster and said resilient and friction means.

6. In a car truck, the combination of a side frame including tension and compression members and spaced connecting column guides forming a bolster opening, a bolster extending into said opening and slidably cooperating with said column guides, resilient means and resilient and friction means for supporting said bolster, and equalizer means interposed between said bolster and said resilient and friction means.

7. In a car truck, the combination of a side frame including tension and compression members and spaced connecting column guides forming a bolster opening, a bolster extending into said opening and slidably cooperating with said column guides, springs of different character in said bolster opening for supporting said bolster, and equalizer means interposed between said springs and said bolster.

8. In a car truck, the combination of a side frame including tension and compression members and spaced connecting column guides forming a bolster opening, a bolster extending into said opening and slidably cooperating with said column guides, resilient means and friction means in said bolster opening for supporting said bolster, and equalizer means interposed between said bolster and said resilient and friction means.

9. In a car truck, the combination of a side frame including tension and compression members and spaced connecting column guides forming a bolster opening, a bolster extending into said opening and slidably cooperating with said column guides, resilient means and resilient and friction means in said bolster opening for supporting said bolster, and equalizer means interposed between said bolster and said resilient and friction means.

10. In a car truck, the combination of a side frame and a bolster, coil springs and elliptic springs carried by said side frame for supporting said bolster, and equalizing means interposed between said bolster and said coil and elliptic springs and disposed substantially in the plane of said side frame, said bolster engaging said equalizing means between the points of engagement between said equalizing means and said springs.

11. In a car truck, the combination of a side frame and a bolster, coil springs and elliptic springs carried by said side frame for supporting said bolster, and load distributing means interposed between said bolster and said coil and elliptic springs whereby said coil springs and said elliptic springs are permitted independent motion, said means being disposed substantially in the plane of said side frame.

12. In a car truck, the combination of a bolster, a coil spring and a leaf spring carried by said side frame for supporting said bolster, and equalizing means interposed between said bolster and coil and leaf springs, said bolster engaging said equalizing means between the points of engagement between said equalizing means and said springs.

13. In a car truck, the combination of a bolster, a coil spring and a leaf spring carried by said side frame for supporting said bolster, and equalizing means interposed between said bolster and coil and leaf springs disposed substantially in the plane of said side frame, said bolster engaging said equalizing means between the points of engagement between said equalizing means and said springs.

14. In a car truck, the combination of a bolster, coil springs of different characteristics carried by said side frame for supporting said bolster and equalizing means interposed between said bolster and coil springs, said bolster engaging said equalizing means between the points of engagement between said equalizing means and said springs.

15. In a car truck, the combination of a bolster, coil springs of different characteristics carried by said side frame for supporting said bolster and equalizing means interposed between said bolster and coil springs disposed substantially in the plane of said side frame, said bolster engaging said equalizing means between the points of engagement between said equalizing means and said springs.

16. In a car truck, the combination of a side frame and a bolster, coil springs and elliptic springs carried by said side frame for supporting said bolster, and load distributing means interposed between said bolster and said coil and elliptic springs whereby said coil springs and said elliptic springs are permitted independent motion, and means for positioning said load distributing means, said means being on said bolster.

17. In a car truck, the combination of a side frame and a bolster, coil springs and elliptic springs carried by said side frame for supporting said bolster, and load distributing means interposed between said bolster and said coil and elliptic springs whereby said coil springs and said elliptic springs are permitted independent motion, and means for positioning said load distributing means, said means being on said side frame.

18. In a car truck, the combination of a side frame and a bolster, coil springs and elliptic springs carried by said side frame for supporting said bolster, and load distributing means interposed between said bolster and said coil and elliptic springs whereby said coil springs and said elliptic springs are permitted independent motion, and means for positioning said load distributing means, said means being on said side frame and bolster.

19. In a car truck, the combination of a side frame and a bolster, springs of different characteristics carried by said side frame for supporting said bolster, and equalizing means interposed between said bolster and said springs, said bolster engaging said equalizing means between the points of engagement between said equalizing means and said springs.

20. In a car truck, the combination of a side frame and a bolster, springs of different characteristics carried by said side frame for supporting said bolster, and equalizing means interposed between said bolster and said springs, said equalizing means having frictional motion on said bolster during differential motion of said springs.

21. In a car truck, the combination of a side frame including tension and compression members and spaced integrally connecting columns forming a window therewith, a load carrying member extending into said window, resilient means of different character disposed in said window for supporting said load carrying member, and a load distributing and equalizing member interposed between said load carrying member and resilient means.

22. In a car truck, the combination of a side frame including tension and compression members and spaced integrally connecting columns forming a window therewith, a load carrying member extending into said window, resilient means of different character disposed in said window for supporting said load carrying member, and a load distributing member interposed between said load carrying member and resilient means for permitting differential action of said resilient means, said load distributing member engaging said resilient means at spaced points and engaging said load carrying member between said spaced points.

Signed at Chicago, Illinois, this 22nd day of September, 1931.

WILLIAM C. HEDGCOCK.